United States Patent [19]

Faye et al.

[11] Patent Number: 5,790,404
[45] Date of Patent: Aug. 4, 1998

[54] METHOD ENABLING RAPID AND RELIABLE TRIGGERING OF VEHICLE OCCUPANT RESTRAINT SYSTEMS BY SPECTRAL FREQUENCY ANALYSIS OF THE ACCELERATION SIGNAL

[75] Inventors: Ian C. Faye, Stuttgart; Ralf Henne, Sachsenheim, both of Germany

[73] Assignees: Morton International, Inc., Chicago, Ill.; Robert Bosch GmbH, Stuttgart, Germany

[21] Appl. No.: 572,840

[22] Filed: Dec. 14, 1995

[30] Foreign Application Priority Data

Dec. 22, 1994 [DE] Germany .................. 44 45 996.3

[51] Int. Cl.$^6$ ............................................. B60R 21/32
[52] U.S. Cl. .......................... 364/424.055; 364/424.056; 364/485; 364/576; 280/735; 180/282; 340/436
[58] Field of Search .................... 364/424.055, 424.056, 364/424.057, 485, 553, 566, 576; 280/735; 340/436, 429; 180/282; 307/10.1

[56] References Cited

U.S. PATENT DOCUMENTS

| | | | |
|---|---|---|---|
| 4,497,025 | 1/1985 | Hannoyer | 364/424.055 |
| 5,034,891 | 7/1991 | Blackburn et al. | 364/424.057 |
| 5,065,322 | 11/1991 | Mazur et al. | 180/282 |
| 5,164,901 | 11/1992 | Blackburn et al. | 180/271 |
| 5,285,187 | 2/1994 | Hirao et al. | 340/436 |
| 5,379,221 | 1/1995 | Schulter et al. | 280/735 |
| 5,436,838 | 7/1995 | Miyamori | 280/735 |
| 5,555,174 | 9/1996 | Okimoto et al. | 364/424.056 |
| 5,583,771 | 12/1996 | Lynch et al. | 364/424.045 |

FOREIGN PATENT DOCUMENTS

| | | |
|---|---|---|
| 0458796 | 1/1990 | European Pat. Off. . |
| 0305654 | 2/1993 | European Pat. Off. . |

Primary Examiner—Tan Q. Nguyen
Attorney, Agent, or Firm—Gerald K. White

[57] ABSTRACT

Triggering reliably within an extremely short time restraining features, for example, air bags, belt retractors, and other devices, that are provided in motor vehicles to offer a maximum degree of safety to vehicle occupants in the event of an accident, in which an acceleration signal is measured and converted into a speed signal by an integration over time and the speed signal is compared with a triggering threshold in order to determine a triggering criterion, wherein there is a provision for the integration of the acceleration signal (a) to be influenced as a function of a frequency analysis of the acceleration signal (a), wherein the acceleration signal is subjected to a spectral frequency analysis which influences a speed of the integration of the acceleration signal (a), and wherein the frequency analysis is carried out by utilizing a fast Fourier transformation (or the suboperations required from it).

4 Claims, 5 Drawing Sheets

FIG. 2A
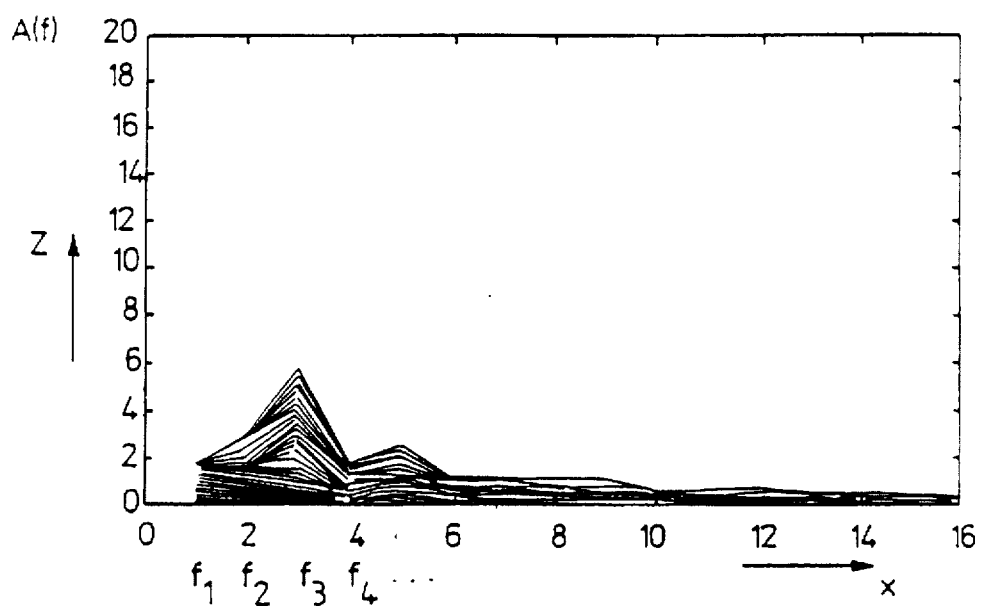
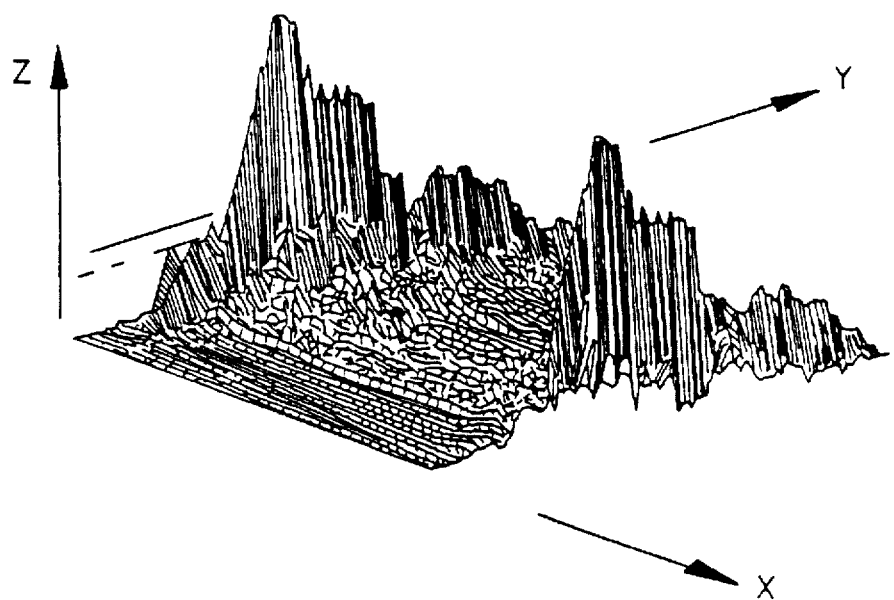
Fig. 2B

Fig. 4A
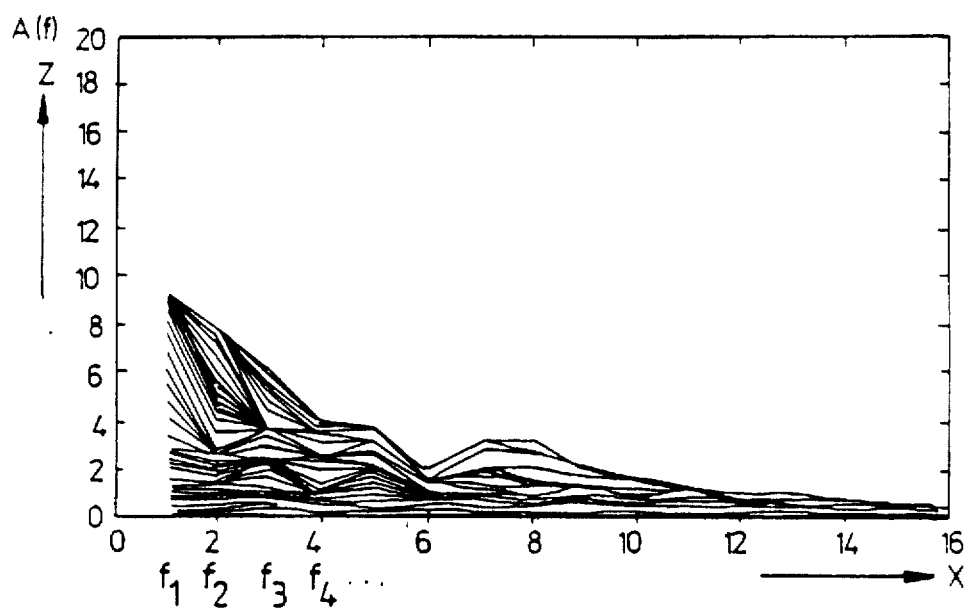
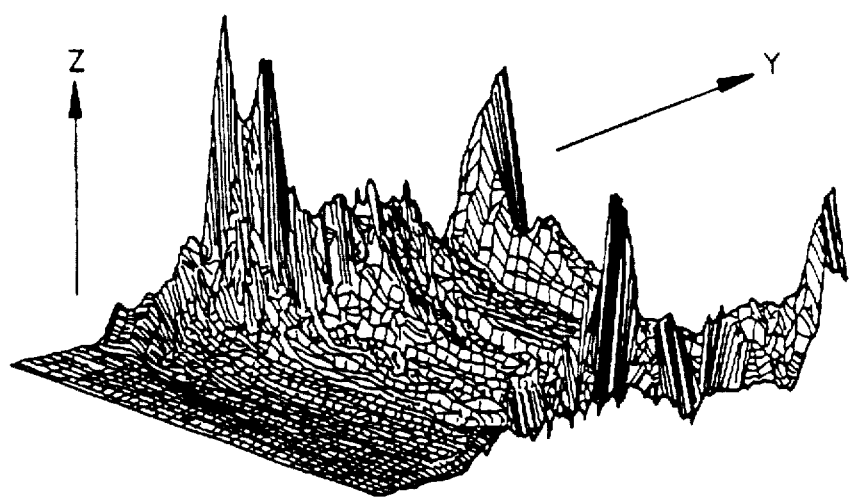
Fig. 4B

Fig. 5A
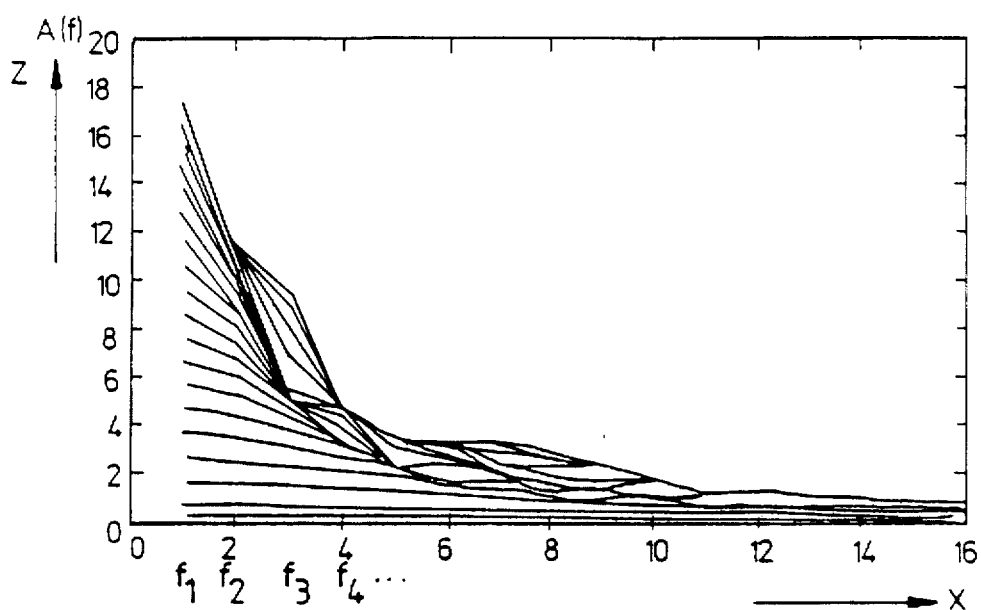
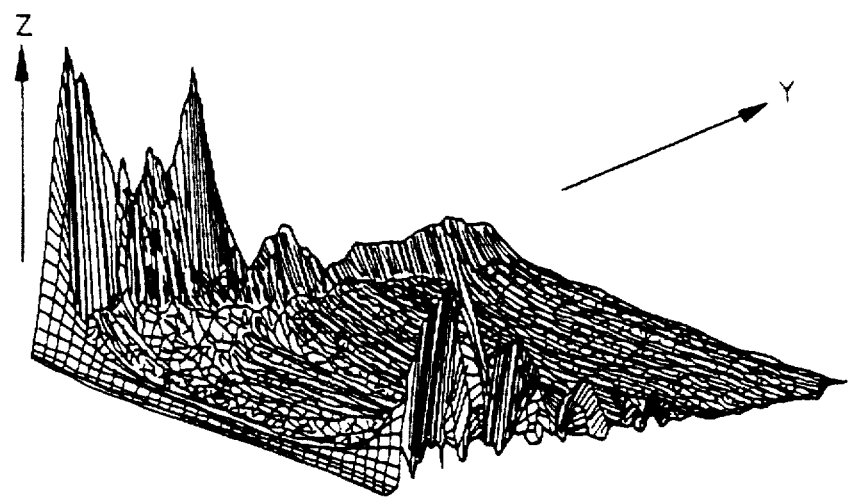
Fig. 5B

METHOD ENABLING RAPID AND RELIABLE TRIGGERING OF VEHICLE OCCUPANT RESTRAINT SYSTEMS BY SPECTRAL FREQUENCY ANALYSIS OF THE ACCELERATION SIGNAL

The invention relates to a method for triggering restraining means, in particular in motor vehicles, according to the preamble of claim 1.

DESCRIPTION OF THE RELATED ART

It is known to use restraining means in motor vehicles, which restraining means are intended to offer a maximum degree of safety to the occupants of the vehicle in the event of an accident. These restraining means are for example airbags, belt retractors and other devices. The function of the restraining means consists in absorbing movement energy of the occupants of the vehicle within a short time in the event of an accident without the occupants of the vehicle being exposed to excessively high deceleration values. The intention is therefore that the restraining means will trigger within an extremely short time.

In order to generate a triggering pulse for the restraining means, it is known to arrange in the vehicle acceleration sensors with which an acceleration signal which is produced as the result of a crash (accident) can be measured. This acceleration signal is integrated in order to obtain a speed signal. The speed signal is compared with a triggering threshold and the triggering pulse for the restraining means is made available as a result of the comparison.

So that the restraining systems can fulfile their function to an optimum degree, it is necessary that, both in the case of head-on crashes and in the case of side crashes, for example the airbags unfold completely before the occupants of the vehicle touch them. As a rule, depending on the type of accident, a triggering decision must be made in the case of a head-on crash within 5 to 60 milliseconds after the start of the accident and in the case of a side crash within 3 to 12 milliseconds after the start of the accident.

When the triggering pulse for the restraining systems, particularly for side airbags, is being produced it is problematic that correctly timed discrimination takes place between those acceleration signals supplied by the sensors which are intended to lead to triggering of the restraining systems and those acceleration signals supplied by the sensors which are not intended to lead to triggering of the restraining systems. It is intended that triggering should not occur for example at low speeds of the motor vehicle or in the case of so-called hammer blows in which there is hardly any risk of injury to the occupants of the vehicle. The triggering signals (triggering pulses) and the non triggering signals are separated from one another by a triggering threshold. This triggering threshold is not a fixed limit value but instead is formed by a range between a maximum non triggering value and a minimum triggering value. A triggering algorithm which makes available the triggering pulse for the restraining systems is configured and set in such a way that signals below the non triggering value do not lead to the restraining systems being fired and signals above the triggering values lead to correctly timed firing. Signals which lie between the maximum non triggering value and the minimum triggering value may either trigger or not trigger. Here, it is disadvantageous that in the event of crashes at speeds around the triggering threshold it is particularly problematic to detect in a correctly timed way whether triggering of the restraining systems is intended to take place. In many cases the acceleration signals in the time range available will not be sufficient. In the event of a non triggering crash it may be the case that high acceleration signals in the first milliseconds lead to a triggering signal although triggering of the restraining systems is not required.

SUMMARY OF THE INVENTION

In contrast, the method according to the invention with the features specified in claim 1 has the advantage that triggering of the restraining systems can be set to a type of crash more safely and reliably. By virtue of the fact that the integration of the acceleration signal is influenced as a function of an analysis of the acceleration signal it is advantageously possible to perform differentiation of the acceleration signal. Thus, displacement of the triggering of the restraining systems depending on the type of accident can be achieved. There is so to speak a displacement of the triggering threshold as a function of the type of accident so that triggering of the restraining systems does not take place in the case of less critical accidents. In the case of critical accidents which initially do not give rise to any large acceleration signals as the result of the presence of relatively easily deformable parts, for example an impact against a weak door, it is nevertheless possible to conclude that a critical crash has occurred so that the triggering threshold for the restraining systems can be jumped over more quickly and thus trigger the said restraining systems in a correctly timed way.

In an advantageous refinement of the invention there is provision for a frequency analysis of the acceleration signals to be carried out in order to acquire the spectrum of the acceleration signal. For this purpose, the acceleration signal is subjected to a fast Fourier transformation. Thus, the dominant components in the spectrum of the dominant components can be easily extracted and the acceleration signals evaluated appropriately. As a function of a result of this evaluation the integration of the dominant components can now be influenced very advantageously in that the acceleration to be integrated is given a higher evaluation in critical situations so that the threshold value (triggering threshold) is exceeded more quickly.

Further advantageous refinements result from the rest of the features specified in the subclaims.

BRIEF DESCRIPTION OF THE DRAWINGS

The invention is explained in greater detail below in exemplary embodiments with reference to the associated drawings, in which:

FIGS. 2A-5B each show diagram for various crash cases.

DETAILED DESCRIPTION OF THE INVENTION

Figure 1:
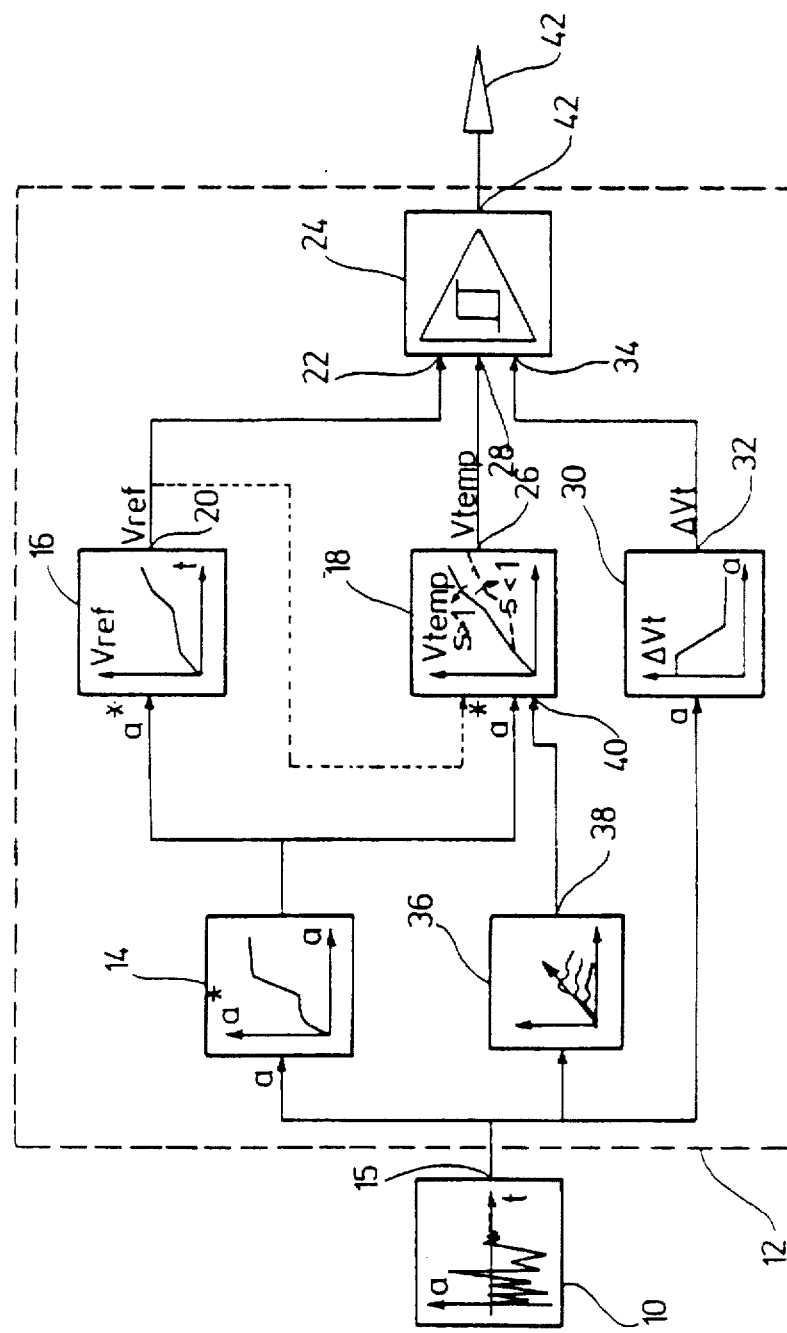
FIG. 1 shows a block circuit diagram of a circuit arrangement for a crash detection means.

In FIG. 1, a block circuit diagram is illustrated which is intended to clarify the algorithm for triggering a restraining means. An acceleration sensor 10 which is arranged in a motor vehicle (not illustrated) supplies, at the start of a collision, a signal which is proportional to the vehicle acceleration occurring as a result of a displacement of a vehicle or deformation of a vehicle. The acceleration sensor 10 supplies a filtered acceleration signal to the triggering algorithm 12. The triggering algorithm 12 contains an amplitude distorter 14 which is connected to an output 15 of the acceleration sensor 10. The distorter 14 itself is connected to a first integrator 16 and to a second integrator 18 which lies in parallel with the latter. An output 20 of the first integrator 16 is itself connected to a first input 22 of a comparator 24. The output 20 of the first integrator 16 also has a feedback connection to the second integrator 18. An output 26 of the second integrator 18 is connected to a second input 28 of the comparator 24. The output 15 of the acceleration sensor 10 is also connected to the function block 30 whose output 32 is connected to a third input 34 of the comparator 24. Furthermore, the output 15 of the acceleration sensor 10 is connected to a function block, designated here as a Fourier block 36, whose output 38 is connected to an input 40 of the second integrator 18. An output 42 of the comparator 24 is connected to a firing source 42 for the restraining means (not illustrated).

The algorithm corresponding to the block circuit diagram illustrated in FIG. 1 carries out the following function:

The acceleration signal a over time which is acquired by means of the acceleration sensor 10 is fed to the distorter 14. The distorter 14 generates a weighted a* from the acceleration signal a. The weighted acceleration signal a* is fed to the first and second integrators 16 and 18. The first integrator 16 calculates a speed reference signal $V_{ref}$ over time from the acceleration signal profile a*. This speed signal $V_{ref}$ is present at the first input 22 of the comparator 24. The second integrator 18 calculates a speed signal $V_{temp}$ over time from the acceleration signal a*, which speed signal $V_{temp}$ is present at the second input 28 of the comparator 24. The integration behavior of the second integrator 18 is influenced by way of the feedback line between the first integrator 16 and the second integrator 18, that is to say as long as the first integrator 16 moves in a selectable, programmable tolerance range the second integrator 18 exhibits the same integration behavior as the first integrator 16. If the first integrator 16 leaves the prescribed tolerance range, the integration behavior of the second integrator 18 is correspondingly adapted.

The acceleration signal a is also present at the function block 30 which generates a function $\Delta Vt$ at its output as a function of a maximum value of the acceleration signal a. The function curve is selected here such that in the case of a small acceleration signal a a large signal $\Delta Vt$ is generated and in the case of a large acceleration signal a a signal $\Delta Vt$ which is small in relation thereto is generated. The generated signal $\Delta Vt$ serves as a triggering threshold value and is fed to the third input 34 of the comparator 24. The comparator 24 compares the signals $V_{ref}$, $V_{temp}$ and $\Delta Vt$ present at its inputs 22, 28 and 34 and transmits a triggering pulse to the firing source 42 for the restraining system. This triggering pulse is transmitted if the signal $V_{ref}$ or the signal $V_{temp}$ becomes greater than or equal to the signal $\Delta Vt$. This therefore makes it clear that the quicker the rate at which a signal $V_{ref}$ or $V_{temp}$, which is based on the acceleration signal a obtained by means of the acceleration sensor 10, becomes greater than the signal $\Delta Vt$, the quicker the generation of a triggering pulse of the comparator 24 for the firing source 42.

The unfiltered acceleration signal a is also connected to the Fourier block 36 which carries out a so-called fast Fourier transformation (FFT), to be explained later, and supplies the signal obtained in this way to the input 40 of the second integrator 18. This signal which is designated by S makes it possible to adjust the integration speed of the second integrator 18. In the case of a signal S which is greater than 1 the integration speed is increased while in the case of a signal S which is smaller than 1 the integration speed is decreased. It therefore becomes clear that the greater the signal S, the quicker the rate at which the second integrator 18 integrates the weighted acceleration signal a*. As a result, it is possible to exceed the triggering threshold determined by the signal $\Delta Vt$ more quickly and thus to make the comparator 24 transmit the triggering pulse to the firing source 42 earlier. This procedure is particularly appropriate if in the case of critical collisions relatively weak parts of the motor vehicle are struck first so that initially large acceleration signals a do not occur. Thus, the signals $V_{ref}$ and $V_{temp}$ which are dependent on the integration of the filtered acceleration signal a would also be small at first and would not be able to exceed the triggering threshold $\Delta Vt$. It is precisely this which is avoided by the quicker integration of the integrator 18 so that in the case of acceleration signals a which are initially small correctly timed triggering of the restraining system is brought about.

The function of the Fourier block 36 is clarified with reference to the examples illustrated in FIGS. 2A to 5B. The examples illustrated in the figures correspond to the signal profiles which occur in the case of so-called side collisions and thus serve for example to trigger restraining systems, for example side airbags, which act transversely with respect to the longitudinal axis of the motor vehicle. Since in the case of a collision which takes place from the side the occupants of the vehicle move directly into a deformation area of the motor vehicle very much more quickly, here, in contrast with a head-on collision, more rapid triggering of the restraining system is required.

In the figures firstly that include "A" in the label, the frequency spectrum of the acceleration signal a is illustrated on the x axis with its amplitude plotted on the z axis. The frequency on the x axis is standardized. In addition, in the respectively associated three-dimensional illustration the include B in the label, the time profile E is plotted on the y axis. At each time increment the Fourier block 36 carries out a Fourier analysis of the acceleration signal a, the frequency values 1 to n of the frequency spectra present being taken into account. Here, at each time increment a fast Fourier transformation or only necessary suboperations of the FFT of the 32 preceding acceleration values (at the preceding time increments) are carried out. As a result of this Fourier transformation the calculation is displaced at each time increment, that is to say the preceding 31 acceleration values are transformed together with the present acceleration value. This Fourier transformation is continuously carried out and recalculated at each new cycle, that is to say at each new time increment. The signal diagram illustrated in the figures is thus obtained for each time increment, the transformed acceleration value being illustrated as a function of the frequency, the time and the amplitude. At each time increment a new diagram is thus obtained which is dependent on the profile of the acceleration signal a. The spectral acceleration density, identified by means of the fast Fourier transformation, corresponding to the sampling frequencies 1 to n can now be used to evaluate the acceleration signal a. The amplitude profile A(f) of the spectral acceleration density exhibits a different level at different frequency values and permits a maximum value to the determined at a specific frequency value. A comparison of the maximum values $A(f_1)$ to $A(f_n)$ occurring at specific frequency values can be used to make available the signal S which determines the speed of the integration of the second integrator 18 (FIG. 1). In real time evaluation of the acceleration signal a, an amplitude profile of the Fourier-transformed acceleration values is obtained, which amplitude profile constitutes a profile of the amplitudes A(f) at the higher frequencies. The signal S is obtained by the amplitudes A(f) being differentiated, it being possible for differentiation to take place at specific frequency values which are typical of crashes. If, for example, the amplitude A(f1) is differentiated with the amplitude A(f3), assuming a relationship in which A(f1) is greater than A(f3) a signal S which is greater than 1 is triggered, which brings about an acceleration of the integration behavior of the second integrator 18. However, if, during the differentiation of the amplitudes, the amplitude A(f3) is greater than the amplitude A(f1) a signal S smaller than 1 can be calculated. This would lead to a slowing down of the integration speed of the second integrator 18. On the basis of the known probability of the frequencies resulting from the acceleration signal a at which a simple or a complicated crash (collision) will occur, a safe and reliable triggering of the restraining system can be set by means of the differentiation of the amplitude values A(f) in selectable frequency spectra (sampling frequencies). Thus, in particular in the case of so-called side crashes in which an extremely small reaction time is available the behavior of the restraining systems can be optimized, that is to say they can be set in such a way that they trigger in a correctly timed way.

In FIG. 2A and FIG. 2B, an exemplary signal profile for a side crash at a speed of 17 km/h is illustrated. It is assumed that a fast Fourier transformation with 32 acceleration values in a time period of t equal to 0 milliseconds to 60 milliseconds is carried out. It can be seen that the amplitudes A(f) of the spectral acceleration density in the direction of time rise sharply at the beginning and have a maximum value at the amplitude A(f3), which maximum value is above the amplitude A(f1). In this case, a signal S smaller than 1 would be generated by means of the Fourier block 36 so that the second integrator 18 integrates more slowly and it would thus be decided that it was a case of a so-called non trigger. The signal $V_{temp}$ would thus not rise above the signal $\Delta Vt$ and the comparator 24 would thus not generate any triggering pulse.

Figure 3A:
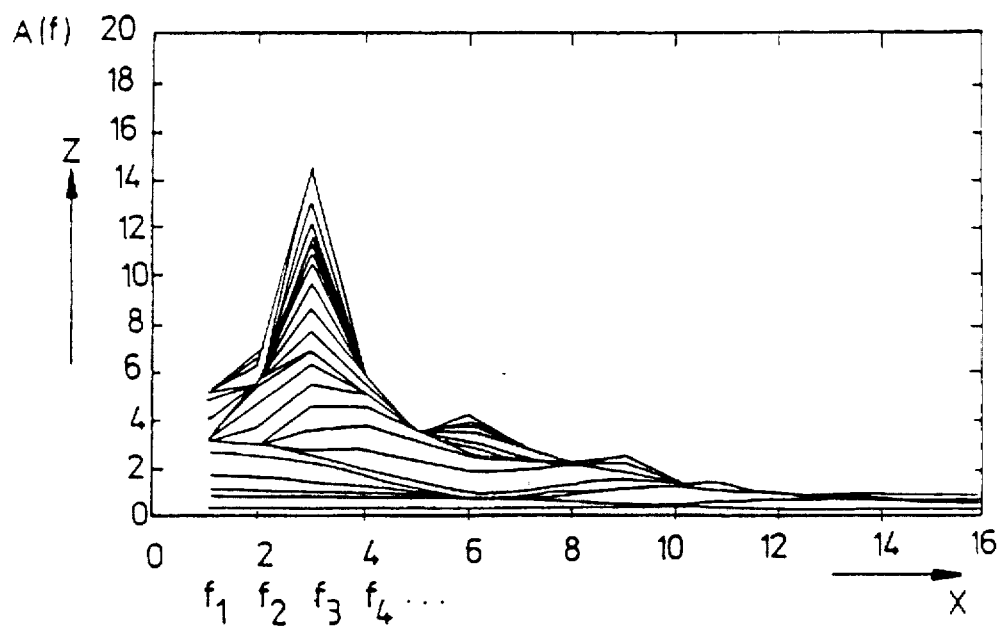
Figure 3B:
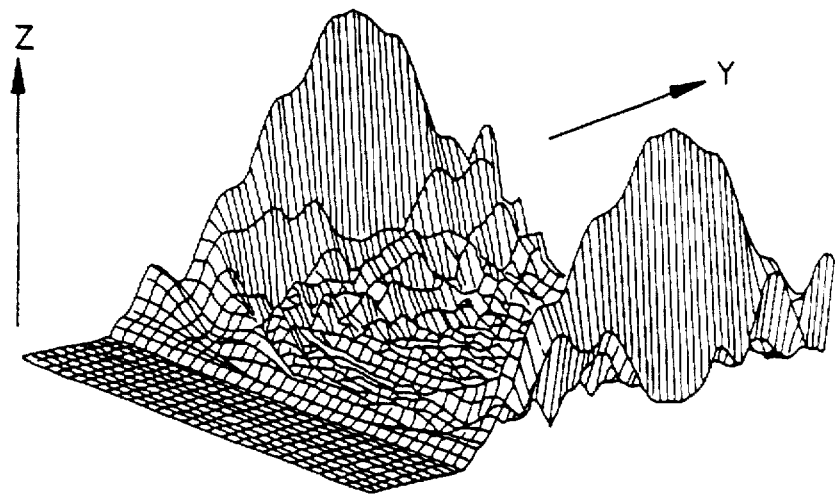

In FIGS. 3A and 3B, a further example is illustrated by way of a so-called hammer blow. The first 20 milliseconds are considered. The amplitude profile of the spectral acceleration density also exhibits a steep rise over time, the amplitude value A(f3) being greater than the amplitude value A(f1). Thus, a signal S smaller than 1 would thus be detected again, which causes the comparator 24 not to be triggered—as already explained.

FIGS. 4A and 4B show the profile of the spectral acceleration density in the case of a side crash at 27 km/h. A time profile of 0 to 60 milliseconds is assumed. Over the time profile, the amplitude profile A(f) exhibits a slow rise which changes into sudden maximum peak values. The amplitude value A(f1) is greater than the amplitude value A(f3) so that the peak of the acceleration densities lies at the low sampling frequencies. During a differentiation of the amplitude value A(f1) with the amplitude value A(f3) it is found that the latter is greater so that the signal S also becomes greater than 1. Thus, the second integrator 18 is made to integrate the weighted acceleration signal a* more quickly and the threshold value prescribed with the signal $\Delta Vt$ is exceeded sooner. Thus, a case of triggering is detected, that is to say the comparator 24 transmits a triggering pulse to the restraining systems.

In FIGS. 5A and 5B, a further example referring to a collision at a speed of 54 km/h is illustrated. It becomes readily apparent that the amplitude values A(f) immediately reach very high values and drop off in the direction of time. The amplitude value A(f) at low frequencies is also very high and decreases in the direction of higher frequencies. Thus, the amplitude value A(f1) at the sampling frequency 1 is greater than the amplitude value A(f3) at the sampling frequency 3, that is to say a signal S greater than 1 is generated by means of the Fourier block 36 again. As a result, triggers are detected so that the comparator 24 brings about—as already mentioned—a rapid triggering of the restraining systems.

In summary, it becomes clear that with the method according to the invention it is possible to decide, as a function of the type of collision, on triggering or non triggering of the restraining systems more rapidly and more reliably. A decision aid, which permits selective setting of the triggering threshold, can be generated easily for this purpose by means of the described frequency analysis of the acceleration signal a. By influencing the integration of the acceleration signal a it is possible to accelerate or delay the reaching of the triggering threshold. As a result, it is even possible to distinguish non triggers from triggers even if the rise in the non triggering signal is greater at the start of the crash than the rise in the triggering signal. The cases of triggering or non triggering illustrated here solely for the example of side crashes can of course be transferred to all other cases of collision which a motor vehicle experiences. In particular in the case of head-on crashes, offset crashes or other possibilities the triggering behavior of the restraining systems can be improved by a corresponding spectral frequency analysis of the acceleration signal a.

What is claimed is:

1. A method for triggering a passive restraint system, comprising the steps of:

measuring an acceleration signal having a frequency spectrum;

performing a spectral frequency analysis upon said signal; and integrating said acceleration signal over time to produce a speed signal, the speed of said integration being varied as a result of said spectral frequency analysis; and comparing said speed signal to a triggering threshold and producing an activation signal if said speed signal exceeds said threshold;

wherein said step of performing a spectral frequency analysis includes at least a portion of a fast Fourier transformation, and wherein said step of performing a spectral frequency analysis is repeated at prescribed time increments, and said portion of a fast Fourier transformation is performed using said acceleration signal at a predetermined number of preceding ones of said time increments.

2. A method as in claim 1, wherein at each time increment n, the preceding $2^n$ ones of said time increments are transformed.

3. A method as in claim 1, wherein said step of performing a transformation produces amplitudes A(f) of selected frequencies within said acceleration signal.

4. A method as in claim 3, wherein said step of performing a spectral frequency analysis further includes differentiating two of said amplitudes A(f), and further, wherein said integration step is accelerated when the result of said differentiation is greater than 1, and said integration step is slowed when the result of said differentiation is less than 1.

* * * * *